(12) United States Patent
Oda

(10) Patent No.: US 6,630,084 B1
(45) Date of Patent: Oct. 7, 2003

(54) METHOD OF MAKING FERRITE MATERIAL POWDER BY SPRAY PYROLYSIS PROCESS AND METHOD OF PRODUCING FERRITE MAGNET

(75) Inventor: Etsushi Oda, Osaka (JP)

(73) Assignee: Sumitomo Special Metals Co., Ltd. (JP)

( * ) Notice: Subject to any disclaimer, the term of this patent is extended or adjusted under 35 U.S.C. 154(b) by 233 days.

(21) Appl. No.: 09/680,324

(22) Filed: Oct. 6, 2000

(30) Foreign Application Priority Data

Oct. 8, 1999 (JP) .......................................... 11-287789
May 23, 2000 (JP) ...................................... 2000-151019

(51) Int. Cl.[7] .............................. B29B 9/00; B29B 11/08
(52) U.S. Cl. ................................ 264/6; 264/5; 264/12; 264/125; 264/611; 252/62.56; 252/62.63; 423/594.1
(58) Field of Search .......................... 264/611, 13, 121, 264/125, 115, 5, 6, 12; 423/594.1, 632; 252/62.56, 62.63

(56) References Cited

U.S. PATENT DOCUMENTS

| | | | | |
|---|---|---|---|---|
| 3,897,355 A | * | 7/1975 | Arendt et al. ............. | 252/62.58 |
| 4,765,920 A | * | 8/1988 | Gattuso et al. ........... | 252/62.58 |
| 5,075,090 A | * | 12/1991 | Lewis et al. ................ | 423/337 |
| 5,736,111 A | * | 4/1998 | Saegusa .................... | 423/594.1 |
| 5,750,045 A | * | 5/1998 | Nihira et al. ............. | 252/62.56 |
| 2002/0017628 A1 | * | 2/2002 | Akimoto et al. ......... | 252/62.56 |

FOREIGN PATENT DOCUMENTS

| | | |
|---|---|---|
| DE | 28 32 892 | 2/1980 |
| EP | 0 377 821 | 7/1990 |
| EP | 0 384 384 | 8/1990 |
| EP | 0 462 344 | 12/1991 |
| EP | 0 562 566 | 9/1993 |
| EP | 1 052 658 | 11/2000 |
| JP | 02-271923 | 11/1990 |
| JP | 06-349624 | 12/1994 |
| JP | 10-149910 | 6/1998 |

OTHER PUBLICATIONS

European Search Report, Feb. 9, 2001, 4.

"Development of Hard Ferrite Powders for Improved Permanent Magnets", Jun. 1987, p. 445, Metal Powder Report, vol. 42, No. 6.

Ochiai, T., "Development of Ferrite Raw Powder Production Process with Thermal Decomposition of Iron and Maganese Chloride Solution by Spray Roaster", Jul. 1998, pp. 624–629, Journal of the Japan Society of Powder and Powder Metallurgy vol. 45, No. 7.

W. Siebke, "Development of Hard Ferrite Powders for Improved Permanent Magnets", 1988, pp. 155–162, European Research on Materials Substitution.

* cited by examiner

Primary Examiner—Stephen J. Lechert, Jr.
(74) Attorney, Agent, or Firm—Nixon Peabody LLP; Jeffrey L. Costellia

(57) ABSTRACT

A method of making a magnetoplumbite-type ferrite material powder includes the step of preparing the ferrite material powder by spraying a mixed chloride solution, in which a chloride of iron and a chloride of strontium are dissolved, into a heated atmosphere. The solution of the mixed chloride contains 25% through 35% of the chloride of iron and 2.4% through 4.9% of the chloride of strontium.

15 Claims, 8 Drawing Sheets

AMOUNT OF ETHANOL (wt%)

us 6,630,084 B1

METHOD OF MAKING FERRITE MATERIAL POWDER BY SPRAY PYROLYSIS PROCESS AND METHOD OF PRODUCING FERRITE MAGNET

BACKGROUND OF THE INVENTION

The present invention relates to a method of making a ferrite material powder by an spray pyrolysis process and a method of producing a ferrite magnet using the material powder.

Ferrite is a generic term for various compounds containing an oxide of a divalent cationic metal and an oxide of trivalent iron. Ferrite magnets have found a wide variety of applications in motors, loudspeakers, and so on. Typical materials for ferrite magnets include Sr or Ba ferrites with an M-type magnetoplumbite hexagonal structure ($SrFe_{12}O_{19}$ or $BaFe_{12}O_{19}$).

A basic composition of the M-type magnetoplumbite ferrite is usually represented by the chemical formula of $AO.6Fe_2O_3$, where A is a metal element that exhibits divalent cation and is selected from the group consisting of Sr, Ba, Pb, Ca and so on. Each of these ferrites can be made from iron oxide and a carbonate of strontium (Sr) or barium (Ba) at a relatively low cost by a powder metallurgical process.

The conventional process, however, has the following drawbacks:

1) Material powders are usually mixed and dispersed in their solid phase, and cannot always be mixed uniformly. That is to say, the composition of the resultant mixture is not uniform enough. Because the magnetic properties of the material are proportional to the uniformity of the mix, the magnetic properties of a product made from the mixture like this cannot always reach sufficiently high levels.

2) The material powder is normally calcined at as high a temperature as 1150 to 1400° C., thus raising the production costs.

3) The material powder often increases its particle size during the calcination process. Accordingly, it takes a long time to grind the powder mechanically down to a size of 1 μm or less using a ball mill, for example, in the next pulverization process. In addition, since the grinding medium is worn to a certain degree every time this pulverization process is carried out, some impurities, i.e., particles of grinding medium, might be mixed into the powder, and the composition of the powder might deviate as a result. Furthermore, even after the material powder has been pulverized finely, the powder still does not have a sufficiently sharp particle size distribution. Thus, the magnetic properties of a final product are likely to deteriorate due to all of these problems.

SUMMARY OF THE INVENTION

It is therefore an object of the present invention to provide a ferrite material powder of fine and highly uniform particle sizes and with a uniform composition.

An inventive method of making a magnetoplumbite-type (M-type) ferrite material powder includes the step of preparing the ferrite material powder by spraying a mixed chloride solution, in which a chloride of iron and a chloride of strontium are dissolved, into a heated atmosphere. The solution of the mixed chloride contains approximately 25% to 35% of the chloride of iron and 2.4% to 4.9% of the chloride of strontium.

Another inventive method of making a M-type ferrite material powder includes the step of preparing the ferrite material powder by spraying a mixed chloride solution, in which a chloride of iron and a chloride of strontium are dissolved, into a heated atmosphere. The mixed chloride solution further contains: at least one chloride selected from the group consisting of a chloride of cobalt, a chloride of manganese and a chloride of nickel; and a chloride of lanthanum.

In one embodiment of the present invention, the mixed chloride solution preferably contains: 25% to 35% of the chloride of iron; 1.9% to 4.9% of the chloride of strontium; 0.09% to 1.0% of the at least one chloride selected from the group consisting of the chloride of cobalt, the combined chloride of manganese and chloride of nickel; and 0.16% to 2.0% of the chloride of lanthanum.

In another embodiment of the present invention, a combustible solvent may be mixed into the mixed chloride solution.

Still another inventive method of making an M-type ferrite material powder includes the steps of: spraying a mixed chloride solution, in which a chloride of iron and a chloride of strontium are dissolved, into a heated atmosphere inside a roasting furnace, thereby pyrolizing the mixed chloride solution into the M-type ferrite material powder; and blowing a combustible gas and/or oxygen gas toward a zone where the mixed chloride solution is pyrolyzed to the M-type ferrite material powder.

Yet another inventive method of making an M-type ferrite material powder includes the steps of: spraying a mixed chloride solution, in which a chloride of iron and a chloride of strontium are dissolved, into a heated atmosphere inside a roasting furnace, thereby pyrolyzing the mixed chloride solution to the M-type ferrite material powder; and spraying a combustible solvent toward a zone where the mixed chloride solution is pyrolyzed to the M-type ferrite material powder.

In one embodiment of the present invention, a chloride of lanthanum, and at least one chloride selected from the group consisting of a chloride of cobalt, a chloride of manganese and a chloride of nickel are dissolved in the mixed chloride solution, and the mixed chloride solution is acidic.

In another embodiment of the present invention, the mixed chloride solution is sprayed into the furnace preferably at a temperature between 800° C. and 1300° C., more preferably at a temperature between 900° C. and 1200° C.

In still another embodiment, the concentration of the chloride of iron in the mixed chloride solution is preferably from 27% to 33%.

In yet another embodiment, a waste produced by acid cleaning at an ironworks may be used as a material for the mixed chloride solution. In this particular embodiment, the mixed chloride solution may be sprayed using a hydrochloric acid collector at the ironworks.

In yet another embodiment, the inventive method may further include the step of conducting a heat treatment on the ferrite material powder. In that case, the heat treatment is conducted preferably at a temperature between 800° C. and 1200° C., more preferably at a temperature between 900° C. and 1050° C.

An inventive method of producing a ferrite magnet includes the steps of: preparing the M-type ferrite material powder that has been made by the inventive method of making the M-type ferrite material powder; and producing a permanent magnet from the ferrite material powder.

DESCRIPTION OF THE PREFERRED EMBODIMENTS

Figure 1:
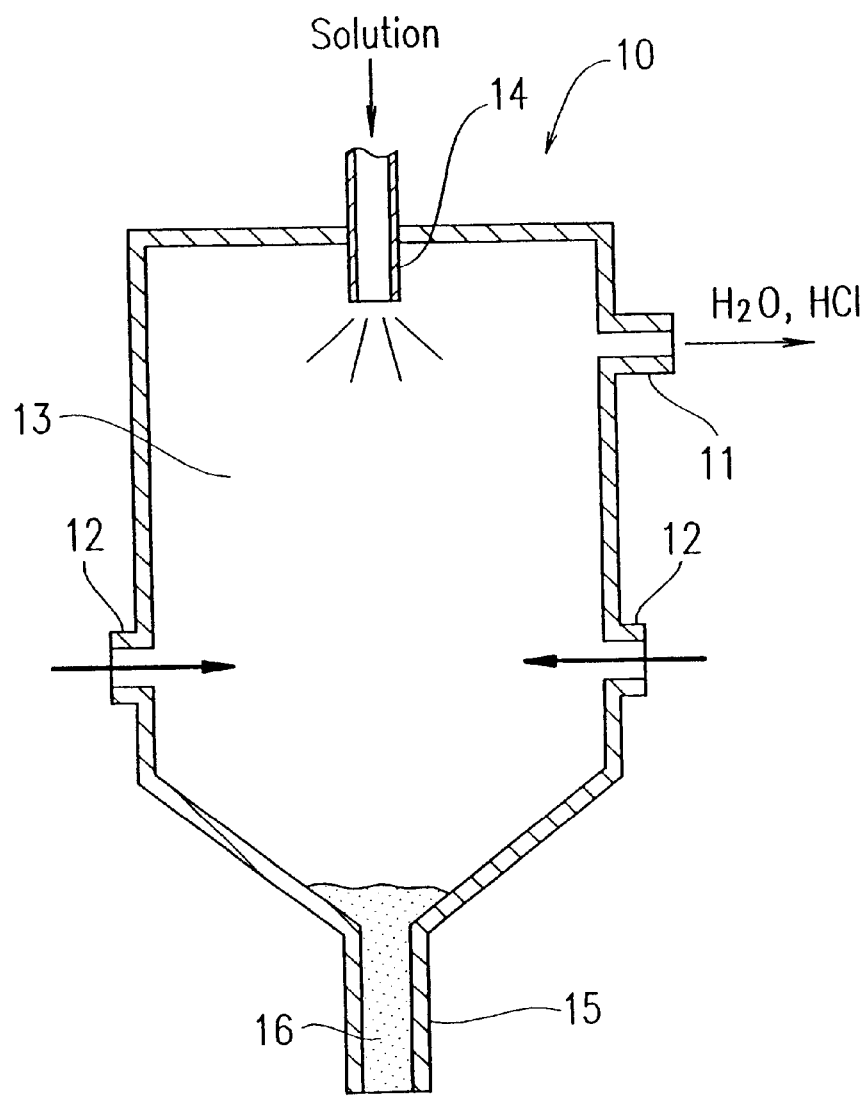
FIG. 1 is a cross-sectional view illustrating an exemplary spray roasting furnace, which is preferably used in an inventive method of making a ferrite material powder.

The present inventors carried out experiments under various combinations of conditions to obtain a hexagonal an M-type ferrite magnet powder of fine and uniform particle sizes and with a uniform composition. In each of these experiments, a mixed chloride solution, in which a chloride of iron and a chloride of strontium were dissolved, was sprayed into a heated atmosphere. As a result, we found that a hard ferrite fine powder with excellent magnetic properties could be obtained by controlling the concentrations of these chlorides contained in the mixed chloride solution within their appropriate ranges.

The results of our experiments also told us that the produced powder might possibly include various phases other than the ferrite crystalline phase (e.g., iron oxide and strontium chloride phases) depending on various conditions such as the temperature of the heating atmosphere. However, we also found that a ferrite material powder with excellent magnetic properties still could be obtained from even such a powder including those unreacted phases (i.e., unferritized phases) and the particle size of the powder did not increase too much if the powder was heat-treated afterwards within an appropriate temperature range. For that reason, the spray-pyrolyzed powder will be always herein referred to as "ferrite material powder" no matter whether the powder includes those non-ferrite crystalline phases or not.

According to the present invention, if a combustible gas and/or oxygen gas is/are blown toward an in-furnace zone where the mixed chloride solution is pyrolyzed to the M-type ferrite material powder, then the temperature in the zone where the ferrite formation occurs can be raised effectively. Thus, even in a roasting furnace at a relatively low temperature, the M-type ferrite material powder can be produced efficiently.

The temperature in the ferrite formation zone can also be raised effectively by spraying a combustible solvent toward the in-furnace zone where the mixed chloride solution is pyrolyzed to the M-type ferrite material powder. Thus, even in a roasting furnace at a relatively low temperature, the M-type ferrite material powder can also be made efficiently.

If a material powder consisting essentially of the M-type ferrite can be obtained by the spray pyrolysis process, then various process steps, including calcination and pulverization, can be omitted from the ferrite powder production process. As a result, the productivity increases and yet the production costs can be cut down. In addition, various deterioration problems referred to in the background of this specification, namely, mixture of impurities and deviation of composition during the pulverization process and broadening of particle size distribution due to the formation of superfine powder, are all avoidable. Furthermore, since powder of a very small particle size (on the orders of sub-microns to several microns) can be obtained, the subsequent pulverization process step can be shortened or even omitted entirely. Moreover, elements of respective materials, including iron and strontium, are uniformly dispersed at the atomic level in the mixed chloride solution. Thus, the uniformity in composition among the powder particles improves. As a result, the final magnet product can also have its composition uniformized.

A Sr ferrite obtained by the present inventive method has an M-type hexagonal structure with a basic composition represented as $SrO.nFe_2O_3$ (where $5.0 \leq n \leq 6.5$). As described above, the as-pyrolyzed powder might possibly include fine particles in unreacted phases (e.g., iron oxide and strontium chloride phases). However, if that powder is heat-treated afterwards, then those unreacted phases can all be eliminated and almost all the powder particles can have the M-type hexagonal structure.

In forming the Sr ferrite, an aqueous solution or hydrochloric acid solution, containing 25% through 35% of a chloride of iron and 2.4% through 4.9% of a chloride of strontium, may be used as the mixed chloride solution to be sprayed. The concentration of the chloride of iron is more preferably from 27% through 32%. The concentration of the chloride of strontium is more preferably from 3.0% through 3.7%.

It should be noted that both of the notations "%" and "wt. %" mean the percentage by mass of a solute to a mixture. For example, when we say "from 25% through 35%", we mean a range from 25% to 35% by mass.

The Sr ferrites of the present invention are not limited to those having the above composition, but may be any ferrites having the M-type hexagonal structure with its basic composition represented as $(1-x)SrO.(x/2)La_2O_3.(n-y/2)Fe_2O_3.yMO$, where x, y and n are mole fractions, $0.05 \leq x \leq 0.3$, $0.05 \leq y \leq 0.3$ and $5.0 \leq n \leq 6.5$ and M is selected from the group of consisting of Co, Mn and Ni. In this case, an aqueous solution or hydrochloric acid solution, containing 25% through 35% of a chloride of iron, 1.9% through 4.9% of a chloride of strontium, 0.16% through 2.0% of a chloride of lanthanum and 0.09% through 1.0% of at least one chloride selected from the group consisting of a chloride of cobalt, a chloride of manganese and a chloride of nickel, is used as the mixed chloride solution.

If necessary, the solution to be sprayed may additionally contain $B_2O_3$ or another compound containing Ca, Si, Al, Ga, In, Li, Mg, Mn, Ni, Cr, Cu, Ti, Zr, Ge, Sn, V, Nb, Ta, Sb, As, W, Mo or a rare-earth element (such as Y). Also, the mixed chloride solution may also contain impurities such as inevitable ingredients in very small amounts.

Before the mixed chloride solution is sprayed into, and heated by, a furnace such as a roasting furnace, 0% through 50% of a combustible liquid such as alcohol may be mixed into the solution. Alternatively, instead of adding the combustible liquid to the solution, a combustible gas may be blown into the solution. In either case, by adding a combustible substance to the solution, even if the atmosphere temperature inside the furnace is relatively low, the mixed chloride solution can be easily pyrolyzed to the M-type Sr ferrite powder by the locally high temperature combustion. However, if the combustible substance is contained in the solution at more than 50%, then the concentrations of chlorides in the mixed chloride solution decrease and therefore, the spray-pyrolyzed powder particles come to have an excessively small size. If the size of the powder particles is too small, it would be difficult to magnetically orient the powder particles even when the powder particles are wet-pressed in a magnetic field. In addition, since the powder particles are likely to increase their size excessively during a sintering process, the final magnet product would exhibit inferior magnetic properties in that situation.

It should be noted that if an aqueous solution or hydrochloric acid solution, containing chlorides of iron and strontium as main ingredients, is sprayed into a roasting furnace at a relatively low temperature of about 800° C. to about 1000° C., then a mixture of an M-type Sr ferrite, iron oxide and/or strontium chloride, which are respective materials of the M-type Sr ferrite powder, is formed easily. Such a mixture has a structure in which fine particles of strontium chloride are dispersed in the powder particles of the M-type Sr ferrite and/or iron oxide with a particle size of 0.1 µm to 5.0 µm. Accordingly, this mixture changes into the M-type Sr ferrite powder at a temperature between 800° C. and 1200° C., which is lower than the normal calcination temperature (between 1150° C. and 1400° C.).

The solution to be sprayed may be prepared by mixing a solution of a chloride of iron with a solution of a chloride of strontium. However, it would be more efficient to prepare the mixture by directly dissolving a strontium material such as strontium carbonate or strontium chloride in the solution of iron chloride.

A waste produced when a steel plate or the like is acid-cleaned during a rolling process at an ironworks may be used as the solution of a chloride of iron. Also, the solution of a chloride of strontium may be obtained not only by directly dissolving a strontium material such as strontium carbonate or strontium chloride in the solution of a chloride of iron but also by dissolving the strontium material in hydrochloric acid.

In forming a $(1-x)SrO \cdot (x/2)La_2O_3 \cdot (n-y/2)Fe_2O_3 \cdot yCoO$ ferrite powder, a lanthanum material such as lanthanum chloride or lanthanum oxide and an element metal M (where M is Co, Mn or Ni) or a chloride, oxide or carbonate thereof may be dissolved in a hydrochloric acid solution or aqueous solution of a chloride of iron.

Also, a nitrate may be used as a material for iron, strontium, lanthanum or cobalt.

Furthermore, the aqueous solution or hydrochloric acid solution of the mixed chloride may be sprayed using a hydrochloric acid collector at an ironworks. Then, the ferrite powder can be obtained efficiently.

FIG. 1 is a cross-sectional view illustrating a schematic structure for a spray roasting furnace 10 for use in making a powder by spraying a mixed chloride solution. The mixed chloride solution is sprayed through a nozzle 14 into the inner space 13 of the furnace 10. An atmosphere gas in the inner space 13 of the furnace 10 is heated by a burner gas injected through openings 12 as indicated by the bold arrows in FIG. 1. The droplets of the mixed chloride solution sprayed come into contact with the heated atmosphere (i.e., hot blast) to be dried and pyrolyzed. Ferrite crystal powder particles 16 formed in this manner are taken out of the inner space 13 through the bottom 15 of the furnace 10. Water vapor, hydrochloric acid, ferrite superfine powder particles and so on, which have been produced in the inner space 13 as a result of the ferrite formation, are drained out of the furnace 10 through an exhaust port 11. In the illustrated example, the burner gas is blown against the atmosphere gas, thereby creating a vortex in the inner space 13.

In this furnace 10, the burner gas is used to heat the atmosphere gas, but an electro-thermal heater may be used instead. Also, the atmosphere gas may be air.

Hereinafter, specific examples of a first embodiment will be described.

EXAMPLE 1

First, iron chloride and strontium chloride were weighted so that $SrO \cdot 5.8Fe_2O_3$ could be obtained when Sr and Fe were reduced to the weights of respective oxides, and then dissolved in distilled water. In this example, the concentration of iron chloride was set to 29%. Next, ethanol at various concentrations was added to this solution and the mixture was stirred up well. The concentrations of ethanol added to the solution were 0%, 20%, 40%, 50% and 60%.

Subsequently, each of these solutions was sprayed into a spray roasting furnace with the atmosphere temperature at the body kept at 1000° C. to obtain a powder. And the constituent materials of each powder obtained were identified using an X-ray diffractometer. The following Table 1 shows the compositions of powders resulting from respective concentrations of ethanol added:

TABLE 1

| Concentration of ethanol added (%) | Phases of Resultant powder |
| --- | --- |
| 0 | $SrO \cdot 6Fe_2O_3 + Fe_2O_3$ |
| 20 | $SrO \cdot 6Fe_2O_3 + Fe_2O_3$ |
| 40 | $SrO \cdot 6Fe_2O_3$ + small amount of $Fe_2O_3$ |
| 50 | $SrO \cdot 6Fe_2O_3$ |
| 60 | $SrO \cdot 6Fe_2O_3$ |

As can be seen from Table 1, when ethanol was added to the solution, the resulting powder consisted of essentially a single-phase M-type Sr ferrite.

The magnetic properties of the powders were evaluated using a vibrating sample magnetometer (VSM). The following Table 2 shows the results of the evaluation:

TABLE 2

| Ethanol added % | Remanence $B_r$ (T) | Saturation magnetization $J_s$ (T) | Coercivity $H_{CJ}$ (kA/m) |
|---|---|---|---|
| 0 | 0.18 | 0.34 | 320 |
| 20 | 0.21 | 0.37 | 350 |
| 50 | 0.23 | 0.40 | 390 |
| 60 | 0.24 | 0.43 | 400 |
| Comparative Example 1 | 0.22 | 0.40 | 260 |

As can be seen from Table 2, the magnetic properties of these powders were very good. The coercivity thereof was particularly excellent.

Figure 2:
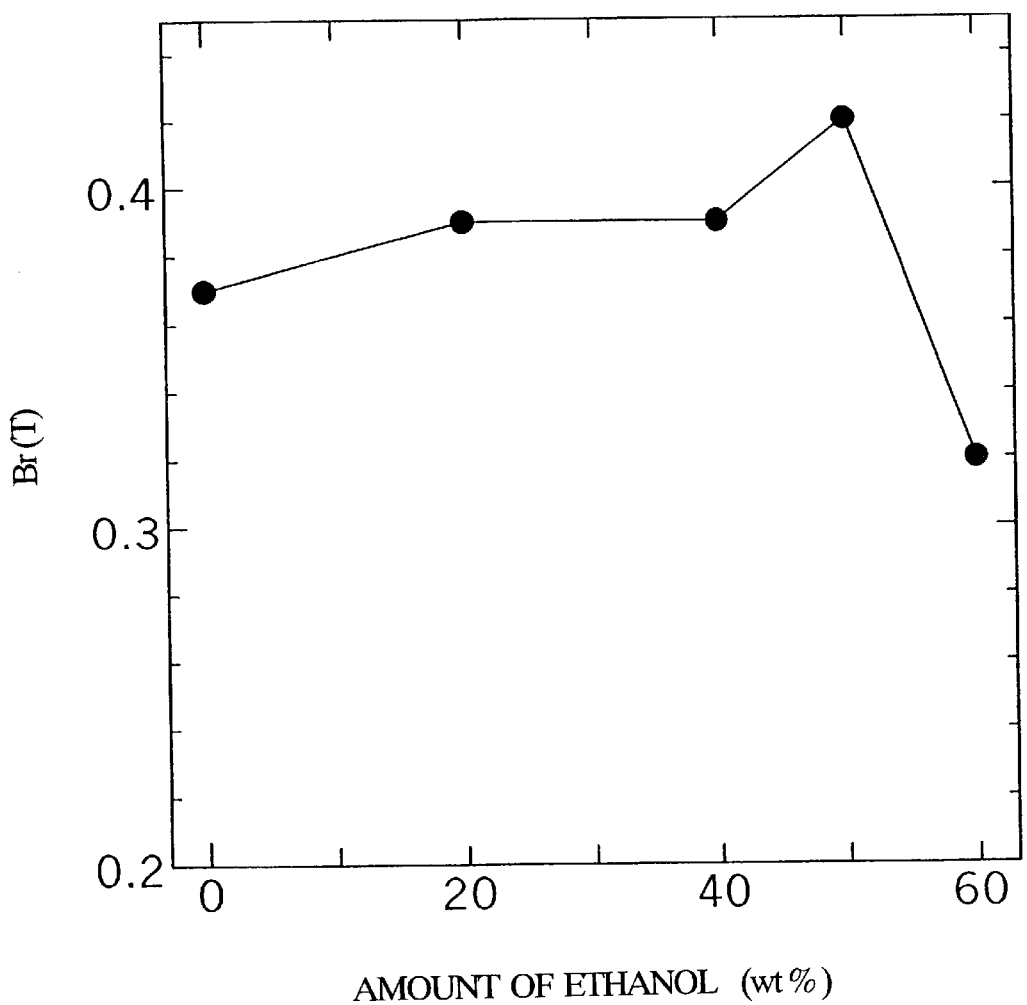
FIG. 2 is a graph illustrating a relationship between the amount of ethanol added to a solution to be sprayed and the remanent magnetic flux density (remanence) $B_r$ of a resultant ferrite material powder.

0.9% of $CaCO_3$ and 0.45% of $SiO_2$ were added to the powder and then the mixture was dissolved in a distilled water solvent to obtain a 45% slurry. Next, the slurry was pulverized for an hour using a wet ball mill, subjected to a wet pressing process and then sintered. The sintering process was carried out with a maximum sintering temperature set to 1210° C. FIG. 2 illustrates the remanence $B_r$ of the sintered bodies obtained in this way. As can be seen from FIG. 2, ethanol is preferably added to the solution at 20% to 50% by mass.

Comparative Example 1

Iron oxide and a carbonate of strontium (Sr) were used as materials and mixed to predetermined mole fractions. The mixed material was calcined at 1330° C., and the calcined powder was pulverized using a ball mill, for example, thereby obtaining an M-type Sr ferrite powder. Next, the powder was heat-treated at 1100° C. for an hour and then the magnetic properties of the resulting powder were evaluated using a VSM. The results are also shown in Table 2.

As can be seen from Table 2, a hard ferrite magnet, which has a remanence $B_r$ and a saturation magnetization $J_S$ comparable to those obtained by the comparative example and yet exhibits a higher coercivity $H_{CJ}$ can be obtained according to the present invention.

EXAMPLE 2

Figure 3:
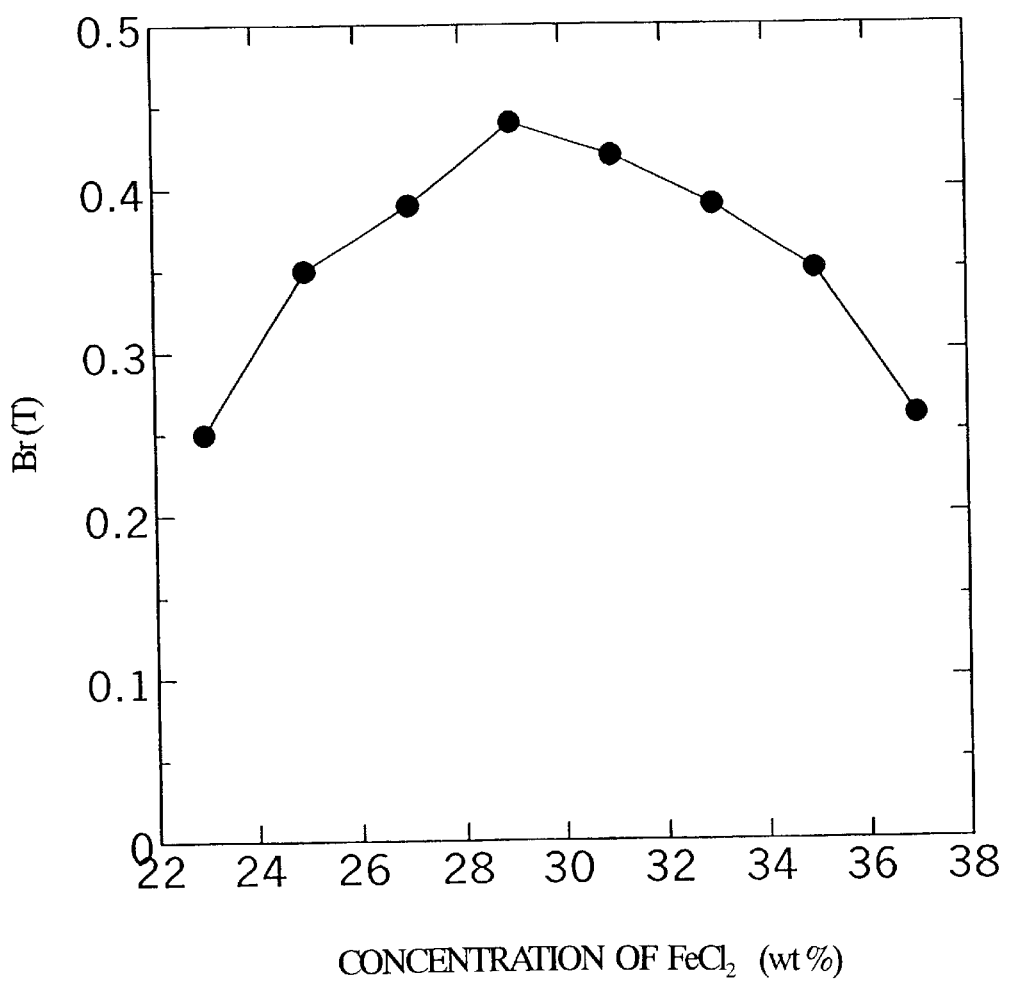
FIG. 3 is a graph illustrating a relationship between the concentration of $FeCl_2$ and the remanence $B_r$ of resultant sintered bodies where the composition of a solution to be sprayed was fixed at $SrO.5.8Fe_2O_3$ when Fe and Sr were reduced to the weights of respective oxides.

Iron chloride and strontium chloride were weighted so that $SrO.5.8Fe_2O_3$ could be obtained when Sr and Fe were reduced to the weights of respective oxides, and then dissolved solved in distilled water. In this example, the concentrations of iron chloride were set to 23, 25, 27, 29, 31, 33, 35, and 37%. Next, ethanol was added to each of these solutions. The concentration of ethanol added to each solution was set to 40%. Subsequently, each of these solution was sprayed into a spray roasting furnace with the atmosphere temperature of the furnace kept at 1080° C. to obtain a powder. Thereafter, 0.9% of $CaCO_3$ and 0.45% of $SiO_2$ were added to the powder and then the mixture was dissolved in a distilled water solvent to obtain 45% slurry. Next, the slurry was pulverized for an hour using a wet ball mill, subjected to a wet pressing process and then sintered. The sintering process was carried out with a maximum sintering temperature set to 1210° C. FIG. 3 illustrates the remanence $B_r$ of the sintered bodies obtained in this way. As can be seen from FIG. 3, the concentration of iron chloride in the solution is preferably between 25% and 35%, because a remanence $B_r$ of 0.35 T or more is attainable in this range. Better properties are realized where the concentration of iron chloride is from 27% through 33%. And the best magnetic properties are realized when the concentration of iron chloride is 29%.

As a result of the experiments, we found that if the concentration of iron chloride was too low (i.e., below the preferable range specified above), then the size of the spray-pyrolyzed particles was excessively small. And we also found that if the concentration of iron chloride was too high (i.e., above that preferable range), then the particles precipitated in the solution to be sprayed and the uniformity in composition of the powder particles adversely decreased.

EXAMPLE 3

Iron chloride and strontium chloride were weighted so that $SrO.5.8Fe_2O_3$ could be obtained when Sr and Fe were reduced to the weights of respective oxides, and then dissolved in distilled water. In this example, the concentration of iron chloride was set to 29%.

Next, ethanol was added to this solution. The concentration of ethanol added to the solution was set to 40%.

Figure 4:
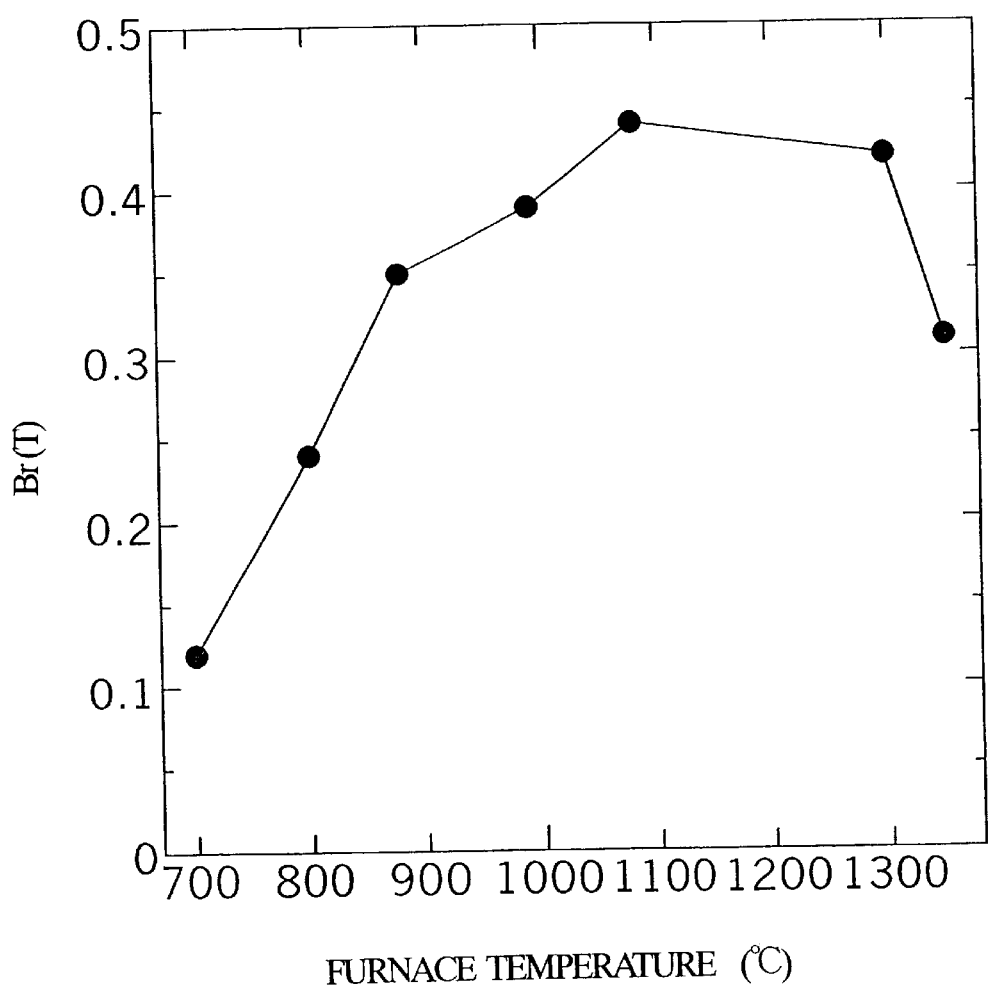
FIG. 4 is a graph illustrating a relationship between the atmosphere temperature in a roasting furnace during a spray pyrolyzing process and the remanence $B_r$ of resultant sintered bodies where the composition of a solution to be sprayed was fixed at $SrO.5.8Fe_2O_3$ when Fe and Sr were reduced to the weights of respective oxides and where the concentration of $FeCl_2$ was fixed at 29%.

Subsequently, the solution was sprayed into a spray roasting furnace with the atmosphere at the body heated to a temperature between 700° C. and 1350° C. to obtain a powder. Thereafter, 0.9% of $CaCO_3$ and 0.45% of $SiO_2$ were added to the powder and then the mixture was dissolved in a distilled water solvent to obtain a 45% slurry. Next, the slurry was pulverized for an hour using a wet ball mill, subjected to a wet pressing process and then sintered. The sintering process was carried out with a maximum sintering temperature set to 1210° C. FIG. 4 illustrates the remanence $B_r$ of the sintered bodies obtained in this way. As can be seen from FIG. 4, the atmosphere temperature during the spray pyrolysis process is preferably between 1000° C. and 1300° C. And the best magnetic properties are realized when the atmosphere temperature is 1100° C.

If the in-furnace atmosphere temperature is relatively low during the spray pyrolysis process, then unreacted iron oxide and/or strontium chloride powder particles are contained in the spray-pyrolyzed powder. Accordingly, if the atmosphere temperature is lower than 900° C., the remanence $B_r$ decreases as the atmosphere temperature decreases. However, as will be described later, if a mixture of ferrite, iron oxide and/or strontium chloride is subjected to an additional heat treatment, then those unreacted powder particles easily react with each other to promote the ferrite formation. As a result, a hard ferrite magnet with good enough magnetic properties can be obtained. Accordingly, if the additional heat treatment is conducted afterwards, the atmosphere temperature during the spray pyrolysis process may be in the range from 800° C. to 900° C. However, if the atmosphere temperature during the spray pyrolysis process is equal to or higher than 900° C., then the additional heat treatment is not necessary and the production process can be simplified. Thus, this temperature is suitable for mass production.

On the other hand, if the in furnace atmosphere temperature during the spray pyrolysis process is relatively high, then the produced particles coagulate to disarrange the magnetic orientations of the sintered bodies. As a result, the remanence $B_r$ tends to decline. Thus, the atmosphere temperature during the spray pyrolysis process is preferably 1200° C. or less.

Taking these results into account, the in furnace atmosphere temperature during the spray pyrolysis process is preferably between 800° C. and 1300° C., more preferably between 900° C. and 1200° C.

In this example, the powder particles were falling down and floating and were directly exposed to the heated atmosphere for about 10 to 20 seconds, inside the furnace during the spray pyrolysis process.

EXAMPLE 4

Iron chloride and strontium chloride were dissolved in distilled water so that the concentration of these chlorides in the solution would be 29% and from 2.0% through 5.0%, respectively. Ethanol was added to this solution and the concentration thereof in the resultant solution was set to 40%. The solution obtained was sprayed into a spray roasting furnace with the atmosphere temperature at its body kept at 1080° C. during the spray pyrolysis process to obtain spray-pyrolyzed powder. And sintered bodies were obtained from this powder in the same way as in the second example.

Figure 5:
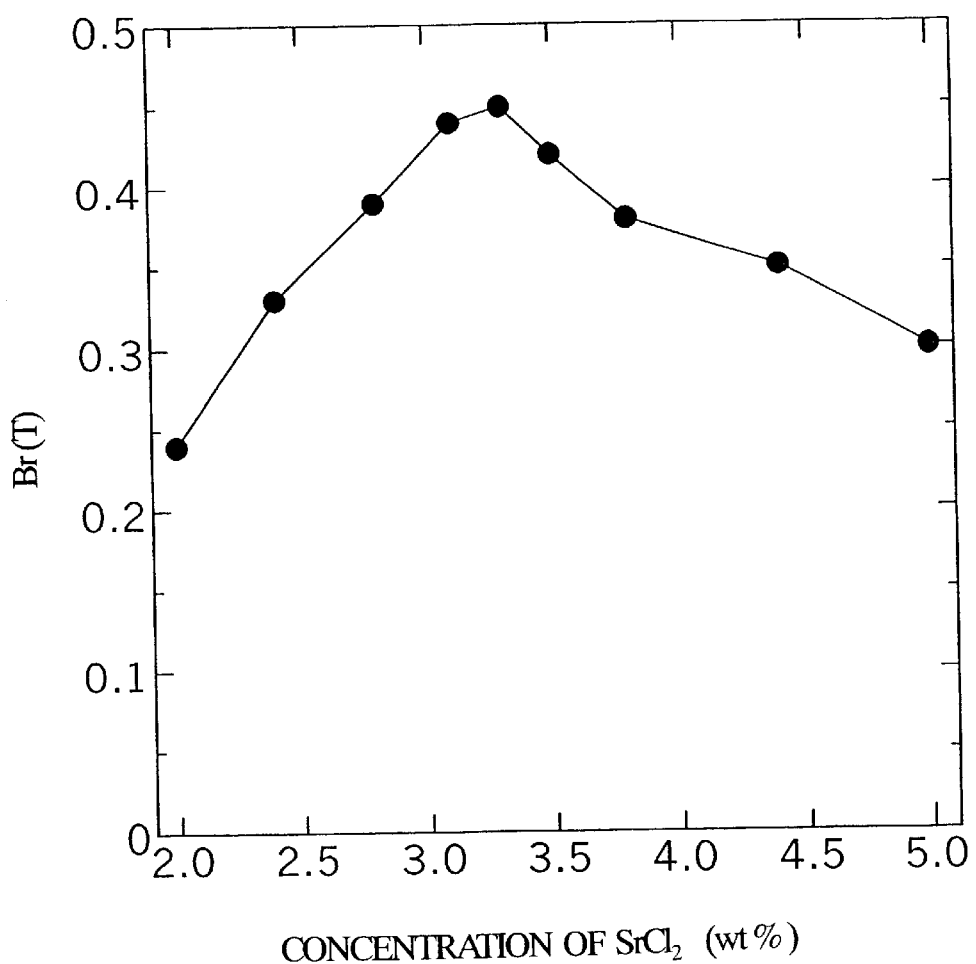
FIG. 5 is a graph illustrating a relationship between the concentration of $SrCl_2$ and the remanence $B_r$ of resultant sintered bodies where the concentration of $FeCl_2$ was fixed at 29% and the atmosphere temperature in a roasting furnace during a spray pyrolyzing process was fixed at 1080° C.

FIG. 5 illustrates the remanence $B_r$ of the sintered bodies obtained in this way. As can be seen from FIG. 5, the concentration of strontium chloride is preferably between 2.4% and 4.9%. And the best magnetic properties are realized when the concentration of strontium chloride is about 3.3%. This is because while the concentration of strontium chloride is in this range, the mole ratio of strontium to iron is optimized and strontium ferrite with a desired composition can be obtained.

EXAMPLE 5

Iron chloride, strontium chloride, lanthanum chloride and cobalt chloride were dissolved in distilled water so that the concentrations of these chlorides in the resultant solution would be one of the combinations shown in Table 3.

TABLE 3

| Composition | x, y | FeCl$_2$ (%) | SrCl$_2$ (%) | LaCl$_3$ (%) | CoCl$_2$ (%) |
|---|---|---|---|---|---|
| (1-x)SrO · (x/2)La$_2$O$_3$ . | 0 | 29 | 3.3 | 0 | 0 |
| (5.5-y/2)Fe$_2$O$_3$ · yCoO | 0.05 | 29 | 3.2 | 0.27 | 0.14 |
| | 0.1 | 29 | 3.0 | 0.53 | 0.27 |
| | 0.2 | 29 | 2.7 | 1.09 | 0.55 |
| | 0.3 | 29 | 2.3 | 1.66 | 0.83 |

Figure 6:
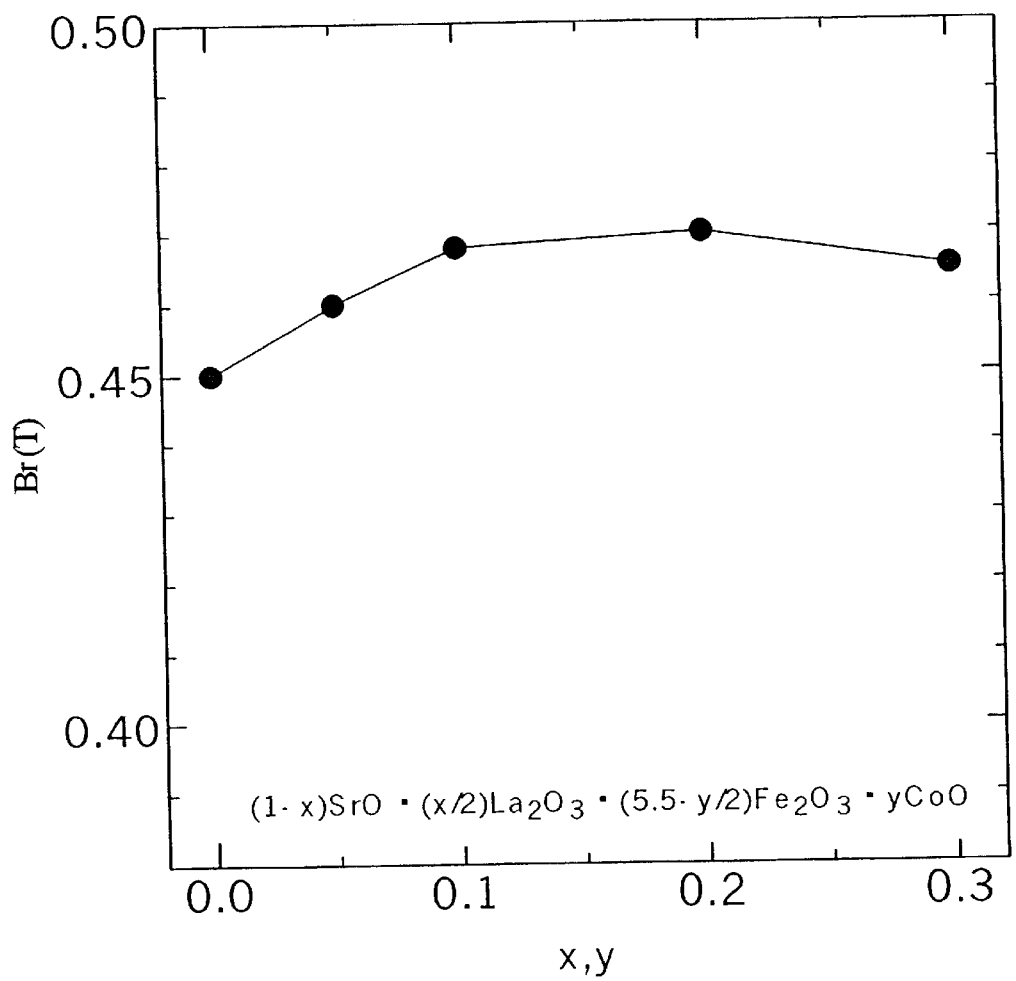
FIG. 6 is a graph illustrating a relationship between x and y in a composition $(1-x)SrO.(x/2)La_2O_3.(5.5-y/2)Fe_2O_3.yCoO$ and the remanence $B_r$ of resultant sintered bodies where the concentration of $FeCl_2$ was fixed at 29% and the atmosphere temperature in a roasting furnace during an atomization process was fixed at 1080° C.

Then, ethanol was added to each of these solutions and the concentration thereof in the resultant solution was set to 40%. The solution obtained was sprayed into a spray roasting furnace with the atmosphere temperature at its body kept at 1080° C. during the spray pyrolyzing process to obtain a ferrite powder. And sintered bodies were obtained from this powder in the same way as in the second example. FIG. 6 illustrates the remanence $B_r$ of the sintered bodies obtained in this way. As can be seen from FIG. 6, when x=y=0.2, the best magnetic properties are attained.

The Sr ferrite obtained in this example has an M-type hexagonal structure with its basic composition represented as (1−x)SrO.(x/2)La$_2$O$_3$.yCoO, where x, y and n are mole fractions and $0.05 \leq x \leq 0.3$, $0.05 \leq y \leq 0.3$ and $5.0 \leq n \leq 6.5$.

According to the results of our experiments, the mixed chloride solution used for making this ferrite is preferably an aqueous solution or hydrochloric acid solution, containing 25% through 35% of FeCl$_2$, 1.9% through 4.9% of SrCl$_2$, 0.16% through 2.0% of a chloride of lanthanum and 0.09% through 0.73% of CoCl$_2$. By using this mixed chloride solution, a ferrite structure, in which part of Fe is replaced with Co and part of Sr is replaced with La, can be obtained. And this substitution improves the magnetic properties.

EXAMPLE 6

Iron chloride and strontium chloride were weighted so that SrO.5.8Fe$_2$O$_3$ could be obtained when Sr and Fe were reduced to the weights of respective oxides, and then dissolved in distilled water. In this example, the concentration of iron chloride was set to 29%. Next, the resultant solution was sprayed into a spray roasting furnace with the atmosphere temperature at the body kept at 900° C. during the spray pyrolyzing process to obtain a ferrite powder. After the resultant powder was heat treated at a temperature between 700° C. and 1300° C. for three hours in the air, the constituent materials of the powder obtained were identified using an X-ray diffractometer. The following Table 4 shows the characterized phases of powders resulting from respective heat treatment temperatures:

TABLE 4

| Heat Treatment Temperature (° C.) | Composition of Resultant powder |
|---|---|
| 700 | Fe$_2$O$_3$ + SrCl$_2$ + SrO · 6Fe$_2$O$_3$ |
| 900 | SrO · 6Fe$_2$O$_3$ + small amount of Fe$_2$O$_3$ |
| 1100 | SrO · 6Fe$_2$O$_3$ |
| 1300 | SrO · 6Fe$_2$O$_3$ |

As can be seen from Table 4, if the heat treatment is conducted on the powder at 1000° C. or more, a powder consisting essentially of a single phase M-type Sr ferrite is produced.

Figure 7:
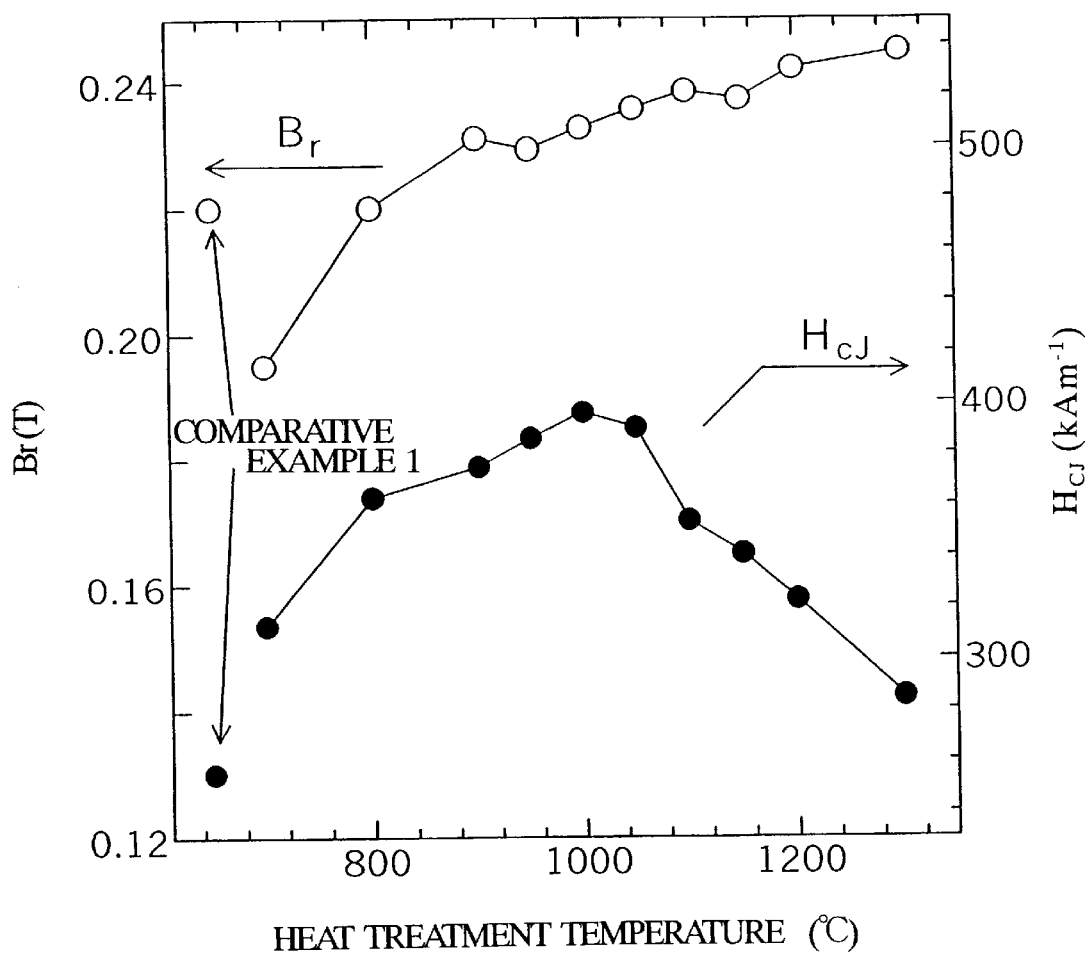
FIG. 7 is a graph illustrating relationships between the magnetic properties of a powder that was made by a spray pyrolyzing process and then heat-treated and the heat treatment temperature.

The magnetic properties of the powders were evaluated using a VSM. FIG. 7 shows the results of the evaluation. As can be seen from FIG. 7, the additional heat treatment is preferably conducted at a temperature in the range from 800° C. and 1200° C. to improve the remanence. However, once the heat treatment temperature exceeds 1050° C., the coercivity starts to decrease because the particle size increases excessively during the heat treatment. Accordingly, to improve both the remanence and the coercivity, the heat treatment is preferably conducted at a temperature in the range from 900° C. to 1050° C.

The heat treatment like this has a secondary effect of removing a sufficient amount of chlorine remaining in the spray-pyrolyzed powder particles. Thus, even if most part of the spray-pyrolyzed powder has already been ferritized, the additional heat treatment is still effective in this sense. Furthermore, the size of the powder particles may be increased intentionally by the additional heat treatment.

In the foregoing examples, a sintered magnet is supposed to be produced using the ferrite material powder obtained by the spray pyrolysis process. However, the present invention is in no way limited to these specific examples. For example, a bonded magnet may be produced using this ferrite material powder in accordance with the present invention.

Figure 8:
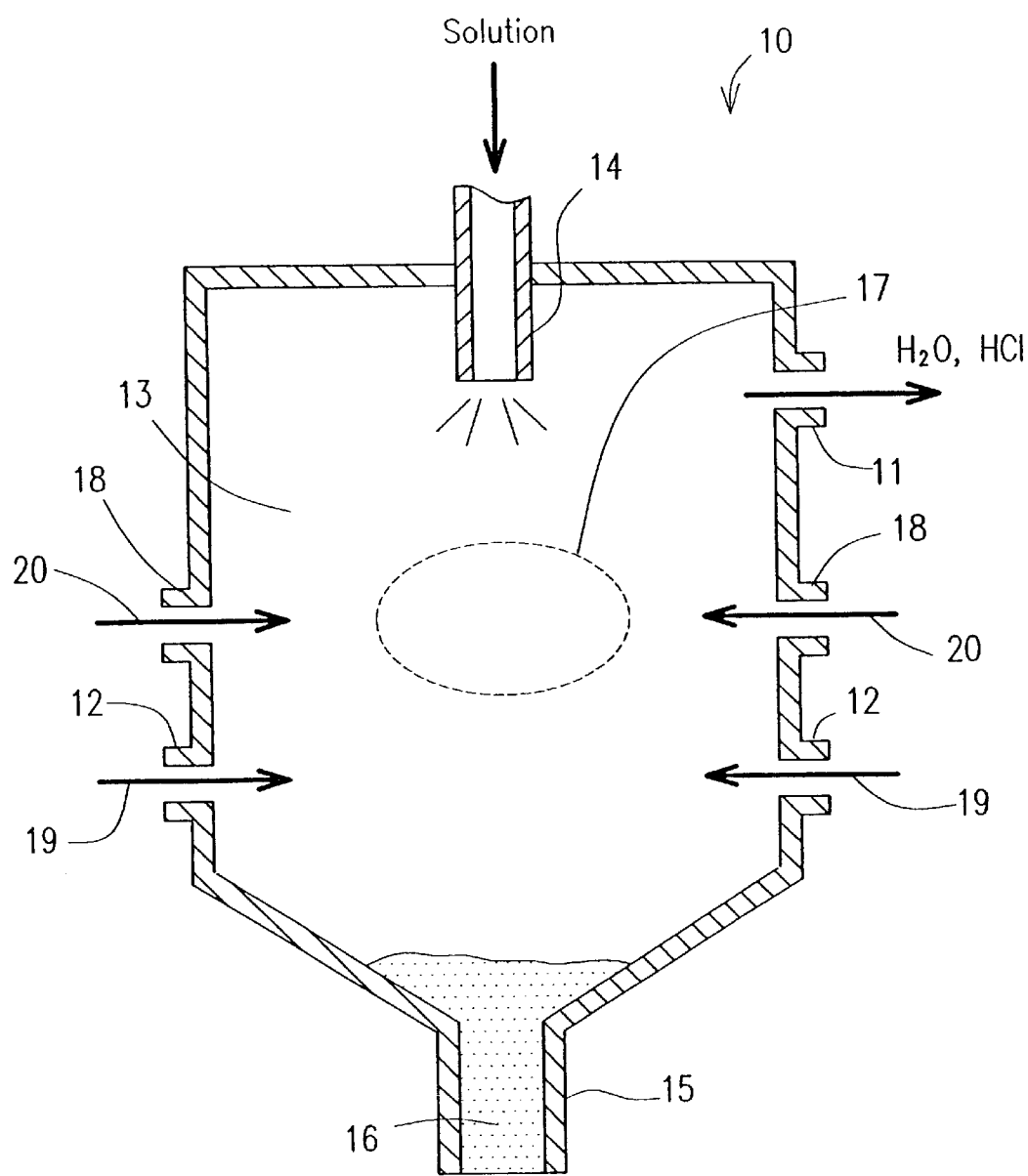
FIG. 8 is a cross-sectional view illustrating another exemplary spray roasting furnace, which is also preferably used in an inventive method of making a ferrite material powder.

FIG. 8 is a cross-sectional view illustrating a schematic structure for a spray roasting furnace 10 for use in making a powder by spraying a mixed chloride solution. The mixed chloride solution is sprayed through a nozzle 14 into the inner space 13 of the furnace 10. An atmosphere gas in the inner space 13 of the furnace 10 is heated by a burner gas injected through openings 12 as indicated by the bold arrows 19 in FIG. 8. The droplets of the mixed chloride solution sprayed come into contact with the heated atmosphere (i.e., hot blast) to be dried, pyrolyzed and ferritized. In FIG. 8, the ferrite formation occurs in a zone 17 as indicated by the dashed circle.

In the illustrated embodiment, a combustible gas and/or oxygen gas is blown, or a combustible solvent is sprayed, against this zone 17 through openings 18, for example, as indicated by the bold arrows 20 in FIG. 8.

In this manner, the temperature in the zone 17 where the ferrite formation occurs can be raised effectively. Thus, even in a roasting furnace at a relatively low temperature, the M-type ferrite material powder can be produced efficiently.

The ferrite powder particles 16 produced in this manner are taken out of the inner space 13 through the bottom 15 of the furnace 10. Water vapor, hydrochloric acid, ferrite superfine powder particles and so on, which have been produced in the inner space 13 as a result of the ferrite formation, are drained out of the furnace 10 through an exhaust port 11. In the illustrated example, the burner gas is blown against the atmosphere gas, thereby creating a vortex in the inner space 13.

In this furnace 10, the burner gas is used to heat the atmosphere gas, but an electro-thermal heater may be used instead. Also, the atmosphere gas may be the air.

The combustible gas and/or the oxygen gas or the combustible solvent may be blown or sprayed against the ferrite formation zone 17 using a spray roasting furnace with a structure different from that illustrated in FIG. 8. For example, the openings 18 may be provided at the same level as, or at a level lower than, the openings 12. Also, the gas or the solvent may be blown or sprayed in any directions other than that illustrated in FIG. 8. Furthermore, nozzles, for example, may be inserted into the openings 18.

In this embodiment, the temperature in the ferrite formation zone can be raised effectively. Thus, even if the roasting furnace as a whole is at a relatively low temperature, the M-type ferrite material powder still can be produced efficiently. As a result, the production cost can be cut down.

The mixed chloride solution used in this embodiment contains: chlorides of iron and strontium, which are two main ingredients of an M-type ferrite; and at least one chloride selected from the group consisting of a chloride of lanthanum, a chloride of cobalt, a chloride of manganese and a chloride of nickel. By dissolving at least one chloride selected from the group consisting of a chloride of lanthanum, a chloride of cobalt, a chloride of manganese and a chloride of nickel in the mixed chloride solution, the M-type ferrite material powder and a ferrite magnet produced from this powder can have their magnetic properties improved.

The concentration of the chloride of iron contained in the mixed chloride solution is preferably from 25% to 35%. The concentration of the chloride of strontium contained in the mixed chloride solution is preferably from 1.9% to 4.9%.

The concentration of the chloride of lanthanum contained in the mixed chloride solution is preferably from 0% to 2%. The concentration of each of the chlorides of cobalt, manganese and nickel contained in the mixed chloride solution is preferably from 0% to 1%.

If the mixed chloride solution is left in the air for a long time, then iron or strontium compounds precipitate in the solution, thus decreasing the uniformity in composition of the solution. However, by keeping this solution acidic with the addition of an acid such as hydrochloric acid to this solution, it is possible to prevent these compounds from precipitating in the solution. As a result, the composition of the mixed chloride solution can be kept uniform. The acidity of this solution is preferably represented in terms of a pH value of 6 or less, more preferably a pH value of 2 or less.

If necessary, about 0.3% or less of $H_3BO_3$, or $B_2O_3$, for example, and about 2% or less of another compound containing Ca, Si, Pb, Al, Ga, Cr, Sn, In, Co, Ni, Ti, Mn, Cu, Ge, Nb, Zr, Li, Mo, Bi or a rare-earth element (such as Y) may be added to the mixed chloride solution. Also, the mixed chloride solution may also contain impurities such as inevitable ingredients in very small amounts.

A waste produced when a steel plate or the like is acid-cleaned during a rolling process at an ironworks may be used as an aqueous solution of iron chloride, which is a main material of the mixed chloride solution. Also, the solution of the chlorides of strontium, lanthanum, cobalt, manganese and nickel can be obtained effectively by directly dissolving materials of strontium, lanthanum, cobalt, manganese and nickel in hydrochloric acid or a solution of iron chloride. Examples of the materials include strontium carbonate, strontium chloride, lanthanum oxide, lanthanum chloride, metal cobalt, cobalt oxide, cobalt chloride, metal manganese, manganese oxide, manganese chloride, metal nickel, nickel oxide and nickel chloride.

The mixed chloride solution is preferably sprayed into a spray roasting furnace at a temperature between 800° C. and 1300° C. If the in-furnace temperature is lower than 800° C., then the sprayed solution cannot be dried, decomposed and oxidized sufficiently. As a result, unreacted iron and strontium compounds, like unreacted chlorides of iron and strontium, are left in large amounts in the material powder obtained. On the other hand, if the in-furnace temperature is higher than 1200° C., then the powder particles produced coagulate. Accordingly, a resultant sintered magnet, produced from such a material powder, may have its magnetic orientation disarranged. Also, if the in-furnace temperature is equal to or higher than 800° C. and lower than 900° C., not only the M-type ferrite but also iron oxide and/or strontium, lanthanum, cobalt, manganese and nickel compounds (e.g., chlorides thereof) might be contained in the resultant material powder. Thus, the mixed chloride solution is preferably sprayed into the roasting furnace at a temperature between 900° C. and 1200° C.

According to this embodiment, by blowing a combustible gas and/or oxygen gas or spraying a combustible solvent against an in-furnace zone where the mixed chloride solution is spray-pyrolyzed to an M-type ferrite material powder, the temperature in this ferrite formation zone can be set higher than the surrounding temperature. Thus, even if the in-furnace temperature is as low as 1000° C. or less, the temperature in the ferrite formation zone can be high enough to obtain the M-type ferrite powder. As a result, the running cost of the roasting furnace can be cut down. In addition, by blowing a combustible gas and/or oxygen gas or spraying a combustible solvent against the zone, the particle shape of the resultant material powder can be improved. Thus, this material powder and a ferrite magnet produced from this powder can have their magnetic properties improved.

Examples of preferred combustible gases according to the present invention include liquefied petroleum gas (LPG), liquefied natural gas (LNG), coal gas, town gas, water gas, producer gas, hydrogen, carbon monoxide, methane, ethane, propane, butane, ethylene, propylene, butylene, acetylene and so on. Examples of preferred combustible solvents according to the present invention include methyl alcohol, ethyl alcohol, ether, acetone, benzene, gasoline, light oil and so on.

Even if the in-furnace temperature is equal to or higher than 800° C. and less than 1000° C., unreacted powder particles can easily react with each other to form a ferrite by conducting additional heat treatment on the material powder produced. As a result, a hard ferrite material powder with good enough magnetic properties can be obtained. The temperature of this additional heat treatment is preferably between 800° C. and 1200° C.

This additional heat treatment has a secondary effect of removing a sufficient amount of chlorides remaining in the material powder particles obtained by the inventive process. Thus, even if most part of the material powder obtained has already been ferritized, the additional heat treatment is still effective in this sense. Furthermore, the size of the material powder particles may be increased to a desired mean particle size by conducting the additional heat treatment.

The roasting furnace used for making the inventive an M-type ferrite material powder may be a hydrochloric acid collector for use in acid cleaning of a steel plate, for example, during a rolling process at an ironworks. In that case, the M-type ferrite-material powder can be obtained efficiently.

Hereinafter, specific examples of the second embodiment will be described.

EXAMPLE 7

$FeCl_2$ and $SrCl_2$ were weighted so that $SrO.5.8Fe_2O_3$ could be obtained when Sr and Fe were reduced to the weights of respective oxides, and then dissolved in distilled water. In this example, the concentration of $FeCl_2$ was controlled to 28% and the pH value of this solution was set to 0 by adding hydrochloric acid thereto. Then, this solution was sprayed into a roasting furnace with oxygen gas blown against a zone where the solution should be pyrolyzed to an M-type ferrite material powder and which had been heated to 1100° C. In this manner, the M-type ferrite material powder was produced.

The temperature of the ferrite formation zone had been 1000° C. before the oxygen gas was blown against the zone. Accordingly, the temperature of the zone rose by 100° C. by the blow of the oxygen gas.

The resultant material powder had a composition represented in terms of an Fe/Sr weight ratio of 91:9. Also, this powder turned out to be $SrFe_{12}O_{19}$ virtually in single phase as a result of an X-ray diffraction analysis. In addition, the magnetic properties of the powder were evaluated using a vibrating sample magnetometer (VSM). The results are shown in Table 5. As can be seen from Table 5, excellent properties were realized.

Next, 0.9% of $CaCO_3$ and 0.45% of $SiO_2$ were added to the material powder obtained and then the mixture was dissolved in a distilled water solvent to obtain a 45% slurry. Next, the slurry was compounded for an hour using a wet ball mill and subjected to a pressing process in a magnetic field. Then, the pressed bodies were sintered at 1210° C. for 30 minutes. The magnetic properties of the resultant sintered bodies are shown in Table 6. As can be seen from Table 6, excellent properties were realized.

In the same way, a C-shaped sintered magnet for motors was also produced from the material powder and incorporated into a motor in place of a sintered magnet made from known materials. When the motor was operated under rated conditions, the motor exhibited good characteristics. The torque of the motor also increased compared to the conventional ones.

In addition, a bonded magnet was also produced from the material powder, and exhibited as good properties as the sintered magnet of this example.

Furthermore, when the material powder was used for a magnetic recording medium, a high output and a high SNR were obtained.

Moreover, when a magnetic recording medium with a thin film magnetic layer was formed by a sputtering process using the material powder as a target, a high output and a high SNR were obtained, too.

EXAMPLE 8

An M-type ferrite material powder and a sintered body were produced in the same way as in the seventh example except that ethanol as a combustible solvent was sprayed against the zone where the ferrite formation should take place. Since ethanol was also sprayed against the zone, the temperature of the zone rose by 80° C., i.e., reached 1080° C.

The magnetic properties of the material powder and the sintered bodies obtained by the eighth example were also excellent as shown in Tables 5 and 6, respectively.

Comparative Example 2

$Fe_2O_3$ and $SrCO_3$ were mixed so that $SrO.5.8Fe_2O_3$ could be obtained when Sr and Fe were reduced to the weights of respective oxides. Next, the mixture was calcined at 1300° C. for three hours in the air. Then, the calcined was pulverized using a roller mill. The pulverized powder was heat-treated at 1100° C. for an hour and then the magnetic properties of the powder were evaluated using a VSM. The results of the evaluation are also shown in Table 5. A sintered magnet was also produced from the powder as in the seventh example. The resultant magnetic properties are shown in Table 6.

Comparative Example 3

An M-type ferrite material powder and a sintered magnet were produced in the same way as in the seventh example except that the mixed chloride solution was sprayed into a roasting furnace in which the temperature of the ferrite formation zone was kept at 1100° C. without blowing any gas (e.g., oxygen) against the zone where the solution should be pyrolyzed to the M-type ferrite material powder. The magnetic properties of the material powder and the sintered bodies obtained in this manner are shown in Tables 5 and 6, respectively.

TABLE 5

|  | Saturation Magnetization $J_S$ (T) | Remanence $B_r$ (T) | Coercivity $H_{CJ}$ (kA/m) |
| --- | --- | --- | --- |
| Example 7 | 0.43 | 0.24 | 380 |
| Example 8 | 0.43 | 0.23 | 386 |
| Cp. Example 2 | 0.40 | 0.22 | 260 |
| Cp. Example 3 | 0.39 | 0.18 | 350 |

TABLE 6

|  | Saturation Magnetization $J_S$ (T) | Remanence $B_r$ (T) | Coercivity $H_{CJ}$ (kA/m) |
| --- | --- | --- | --- |
| Example 7 | 0.43 | 0.41 | 305 |
| Example 8 | 0.43 | 0.40 | 311 |
| Cp. Example 2 | 0.42 | 0.41 | 285 |
| Cp. Example 3 | 0.42 | 0.39 | 290 |

Examples 9 through 15 and Reference Examples 1 and 2

$FeCl_2$ and $SrCl_2$ were weighted so that $SrO.5.8Fe_2O_3$ could be obtained when Sr and Fe were reduced to the weights of respective oxides, and then dissolved in distilled water in each of these examples. The concentration of $FeCl_2$ was controlled to 28% in every case. Then, various chlorides were added in respective amounts to this solution according to the ninth through fifteenth examples and the first and second reference examples. In the ninth example, 0.93% of $LaCl_3$ was added. In the tenth example, 0.49% of $CoCl_2$ was added. In the eleventh example, 0.48% of $MnCl_2$ was added.

In the twelfth example, 0.49% of $NiCl_2$ was added. In the first reference example, 0.52% of $ZnCl_2$ was added. In the second reference example, 0.49% of $CuCl_2$ was added. In the thirteenth example, 0.93% of $LaCl_3$ and 0.49% of $CoCl_2$ were added. In the fourteenth example, 0.93% of $LaCl_3$ and 0.49% of $NiCl_2$ were added. And in the fifteenth example, 0.93% of $LaCl_3$ and 0.49% of $NiCl_2$ were added. Thereafter, in each of these examples, an M type ferrite material powder and a sintered bodies were produced as in the seventh example. The magnetic properties of the resultant magnets were also excellent as shown in Table 7.

TABLE 7

| | Chloride(s) Added | Saturation Magnetization $J_S$ (T) | Remanence $B_r$ (T) | Coercivity $H_{CJ}$ (kA/m) |
|---|---|---|---|---|
| Ex. 9 | $LaCl_3$ | 0.44 | 0.43 | 314 |
| Ex. 10 | $CoCl_2$ | 0.44 | 0.43 | 297 |
| Ex. 11 | $MnCl_2$ | 0.41 | 0.40 | 301 |
| Ex. 12 | $NiCl_2$ | 0.43 | 0.41 | 298 |
| Ref. Ex. 1 | $ZnCl_2$ | 0.43 | 0.41 | 283 |
| Ref. Ex. 2 | $CuCl_2$ | 0.40 | 0.38 | 281 |
| Ex. 13 | $LaCl_3$, $CoCl_2$ | 0.45 | 0.44 | 323 |
| Ex. 14 | $LaCl_3$, $MnCl_2$ | 0.43 | 0.41 | 307 |
| Ex. 15 | $LaCl_3$, $NiCl_2$ | 0.43 | 0.41 | 303 |

Thus, according to the present invention, an M-type ferrite material powder of fine particle size and with narrow particle size distribution and uniform composition can be obtained. Thus, a ferrite magnet, produced from this ferrite material powder, can have its quality greatly improved.

In addition, a number of process steps that have been required by conventional methods, like calcination and pulverization process steps, can be omitted. And the inventive process can be carried out with the inner space of the roasting furnace kept at a relatively low temperature. Thus, according to the present invention, the productivity can be increased and yet the production cost can be cut down.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of making a magnetoplumbite ferrite material powder, comprising the step of preparing said ferrite material powder by spraying a mixed chloride solution, comprising a chloride of iron and a chloride of strontium, into a heated atmosphere, wherein said mixed chloride solution contains 25% to 35% of the chloride of iron and 2.4% to 4.9% of the chloride of strontium, and wherein combustible solvent is added to said mixed chloride solution.

2. A method of making a magnetoplumbite ferrite material powder, comprising the step of preparing said ferrite material powder by spraying a mixed chloride solution comprising a chloride of iron and a chloride of strontium into a heated atmosphere, wherein combustible solvent is added to said mixed chloride solution and, wherein said mixed chloride solution comprises additionally:

at least one chloride selected from the group consisting of:
a chloride of cobalt, a chloride of manganese and a chloride of nickel; and
a chloride of lanthanum.

3. The method of claim 2, wherein said mixed chloride solution contains:

25% to 35% of said chloride of iron;

1.9% to 4.9% of said chloride of strontium;

0.09% to 1.0% of said chloride selected from the group consisting of the chloride of cobalt, the chloride of manganese and the chloride of nickel;

and 0.16% to 2.0% of said chloride of lanthanum.

4. A method of making a magnetoplumbite ferrite material powder comprising the steps of:

spraying a mixed chloride solution, comprising a chloride of iron and a chloride of strontium, to a localized high temperature zone, thereby pyrolyzing said mixed chloride solution into said magnetoplumbite ferrite material powder; and blowing at least one of a combustible gas and oxygen gas into said zone while the mixed chloride solution is pyrolyzed into said magnetoplumbite ferrite material powder.

5. A method of making a magnetoplumbite ferrite material powder comprising the steps of:

spraying a mixed chloride solution, comprising a chloride of iron and a chloride of strontium, to a localized high temperature zone, thereby pyrolyzing said mixed chloride solution to said magnetoplumbite ferrite material powder; and spraying a combustible solvent into said zone.

6. The method of claim 4 or 5, wherein said mixed chloride solution comprises a chloride of lanthanum and at least one chloride selected from the group consisting of a chloride of cobalt, a chloride of manganese and a chloride of nickel, and wherein said mixed chloride solution is acidic.

7. The method of one of claim 1, 2, 4, or 5, wherein said mixed chloride solution is sprayed into said furnace at a temperature between 800° C. and 1300° C.

8. The method of claim 7, wherein said mixed chloride solution is sprayed into said furnace at a temperature between 900° C. and 1200° C.

9. The method of one of claim 1, 2, 4, or 5, wherein the concentration of said chloride of iron in said mixed chloride solution is from 27% through 33%.

10. The method of claim 9, wherein a waste produced by acid cleaning at an iron-works is used as a material for said mixed chloride solution.

11. The method of claim 10, wherein said mixed chloride solution is sprayed using a hydrochloric acid collector at the ironworks.

12. The method of one of claim 1, 2, 4, or 5, further comprising the step of conducting a heat treatment on said ferrite material powder.

13. The method of claim 12, wherein said heat treatment is conducted at a temperature between 800° C. and 1200° C.

14. The method of claim 13, wherein said heat treatment is conducted at a temperature between 900° C. and 1050° C.

15. A method of producing a ferrite magnet comprising the steps of:

preparing said magnetoplumbite ferrite material powder by one of the methods as recited in claim 1, 2, 4, or 5, and producing a permanent magnet from said ferrite material powder.

* * * * *